United States Patent [19]
Russo

[11] Patent Number: 5,160,050
[45] Date of Patent: Nov. 3, 1992

[54] MODULAR APPARATUS USED FOR THE ORDERLY DISPLAY, IN PARTICULAR, OF ADVERTISING FLIERS ACCOMPANYING VIDEOCASSETTES, VIDEOCASSETTES THEMSELVES, OR LIKE MATERIALS

[76] Inventor: Vincenzo Russo, Via Caboto No. 8, 15011 Acqui Terme, Alessandria, Italy

[21] Appl. No.: 517,759

[22] Filed: May 2, 1990

[30] Foreign Application Priority Data

May 2, 1989 [IT] Italy .................... 8604 A/89

[51] Int. Cl.$^5$ .................................. A47G 29/00
[52] U.S. Cl. ........................ 211/40; 211/169
[58] Field of Search ................... 211/169, 40, 96

[56] References Cited

U.S. PATENT DOCUMENTS

| | | | |
|---|---|---|---|
| 1,314,958 | 9/1919 | Goldberg | 211/40 |
| 1,421,391 | 7/1922 | Bower | 211/40 |
| 1,495,152 | 5/1924 | Becker et al. | 211/40 X |
| 2,804,212 | 8/1957 | Spitzig | 211/96 X |
| 3,207,318 | 9/1965 | Gilbert | 211/40 |
| 3,374,794 | 3/1968 | Reed | 211/40 X |

FOREIGN PATENT DOCUMENTS 2124475 2/1984 United Kingdom ................. 211/40

*Primary Examiner*—David L. Talbott

[57] ABSTRACT

This invention pertains to a modular apparatus used for the orderly display, in particular, of advertising fliers accompanying videocassettes, videocassettes themselves, or like materials. Said apparatus possesses multiple flag-boxes (1, 50, 60) for housing at least one pair of fliers, or at least one videocassette, and the like, with said flag-boxes being made of sturdy transparent material and mounted in such a way as to swing along one of their edges (2, 52) like a flag on a support stand (13, 30). The two opposite faces of a flag-box (1, 50, 60) are securely interconnected, along at most three edges (2, 3, 9; 52, 59), but are separated from one another in such a way as to form a housing space, into or from which the pairs of fliers (4), the videocassette (VC), or like materials are inserted or removed through the open edges (5, 53, 55). Along one sealed edge (2, 52), a flag-box (1, 50, 60) possesses oscillating and ideally movable fastening members (7), designed to engage with counterpart members (115, 115', 215', 131) of support components (15, 15', 131) on the support stand (13, 30).

14 Claims, 11 Drawing Sheets

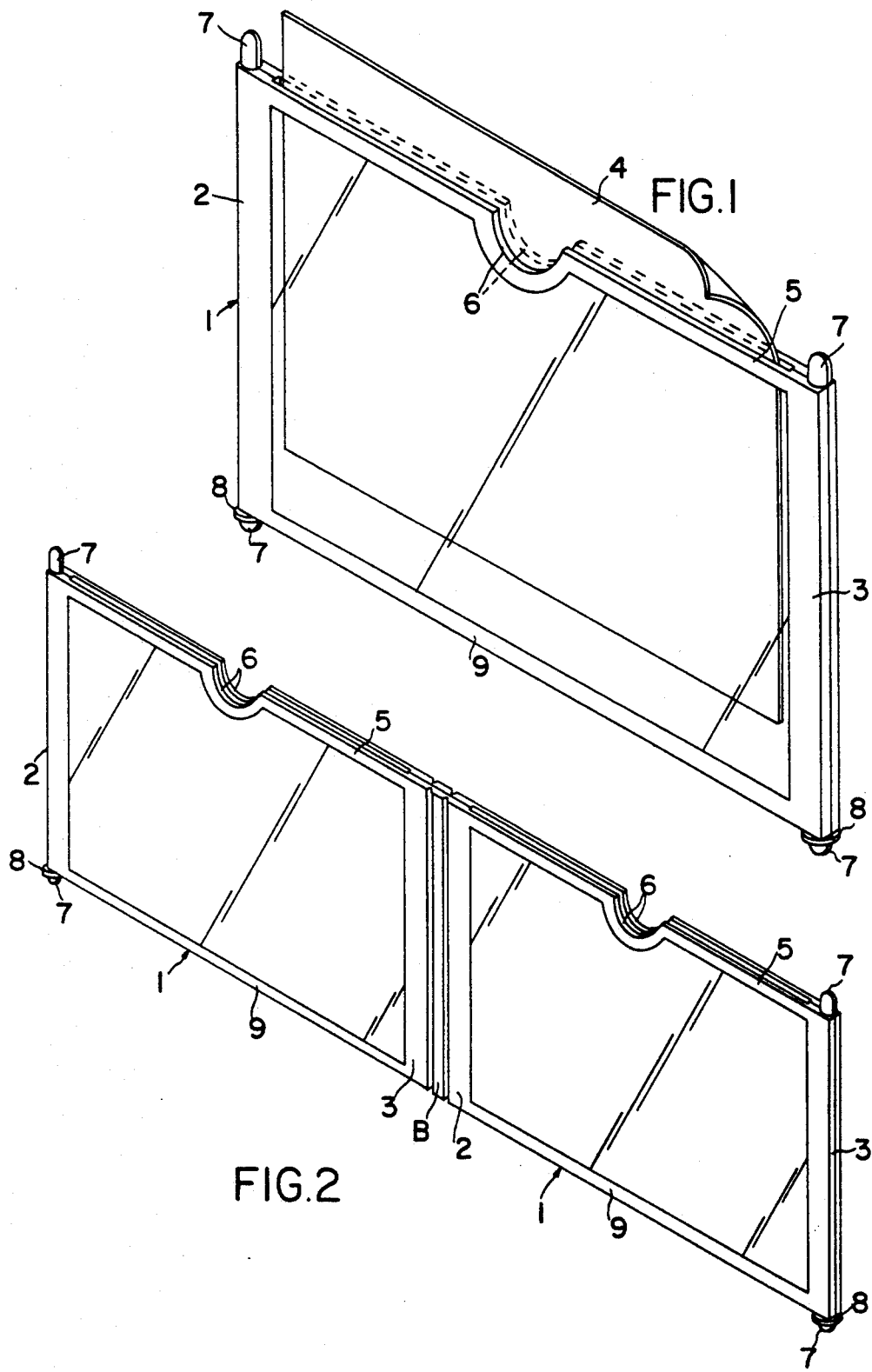

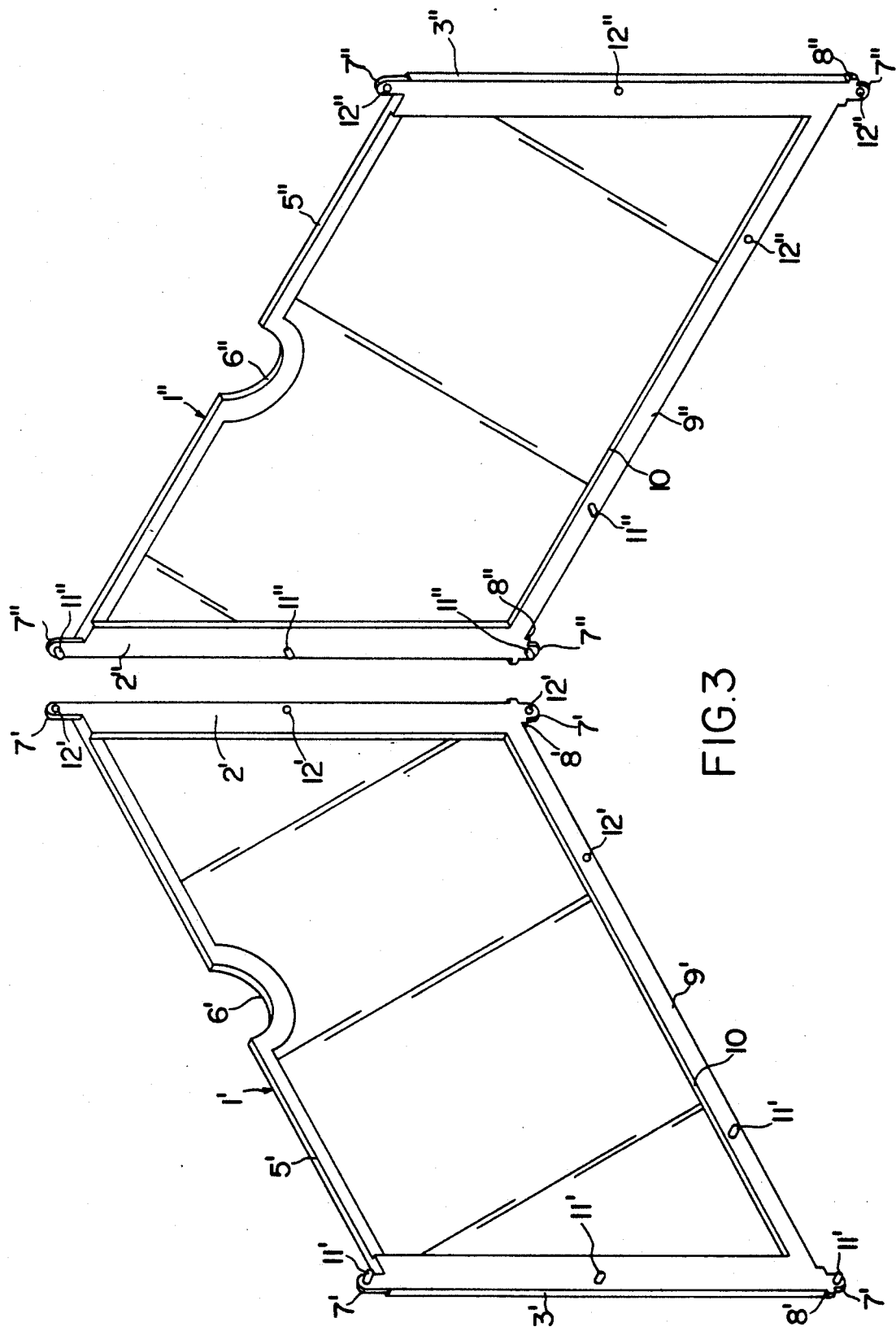

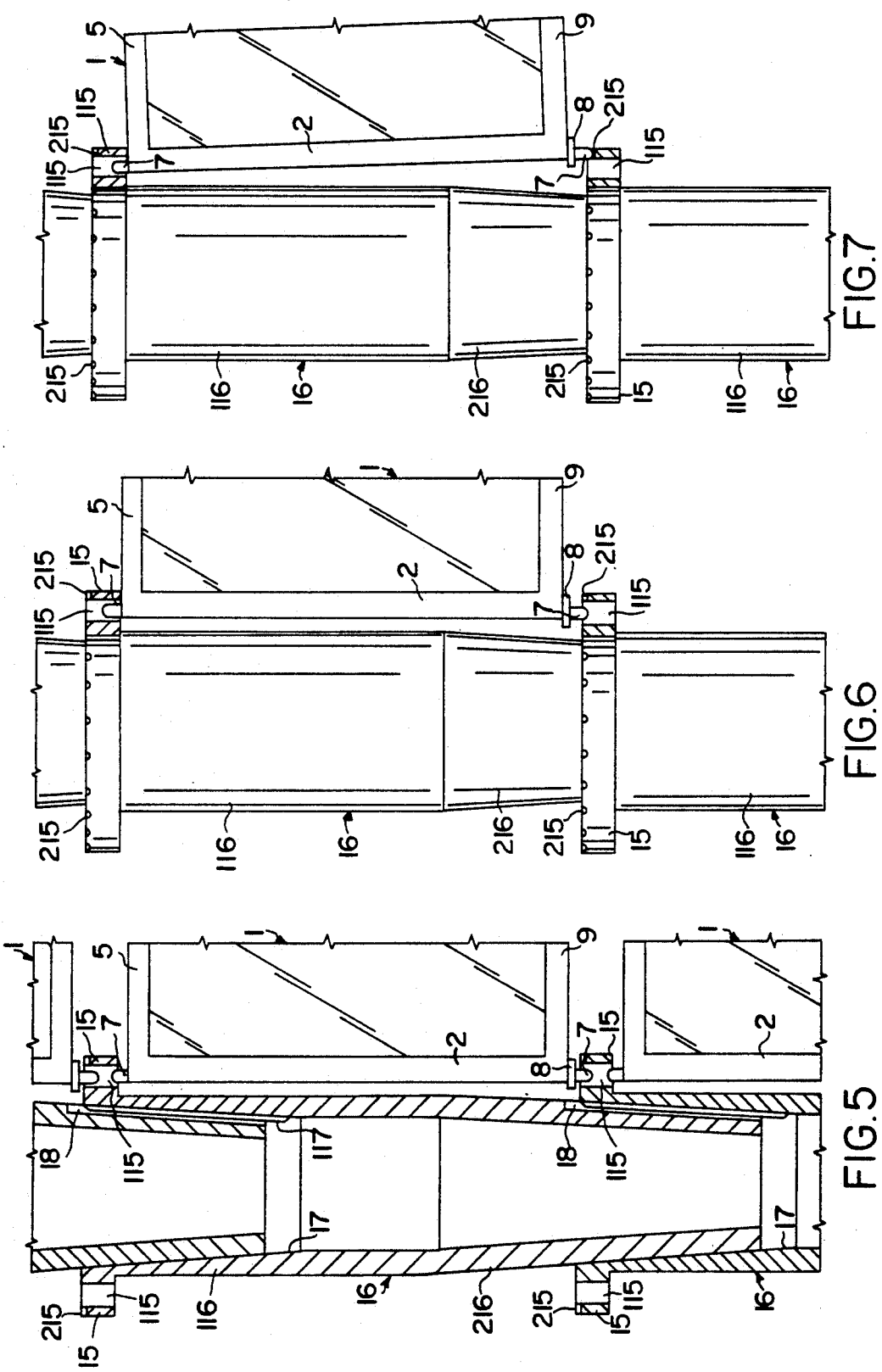

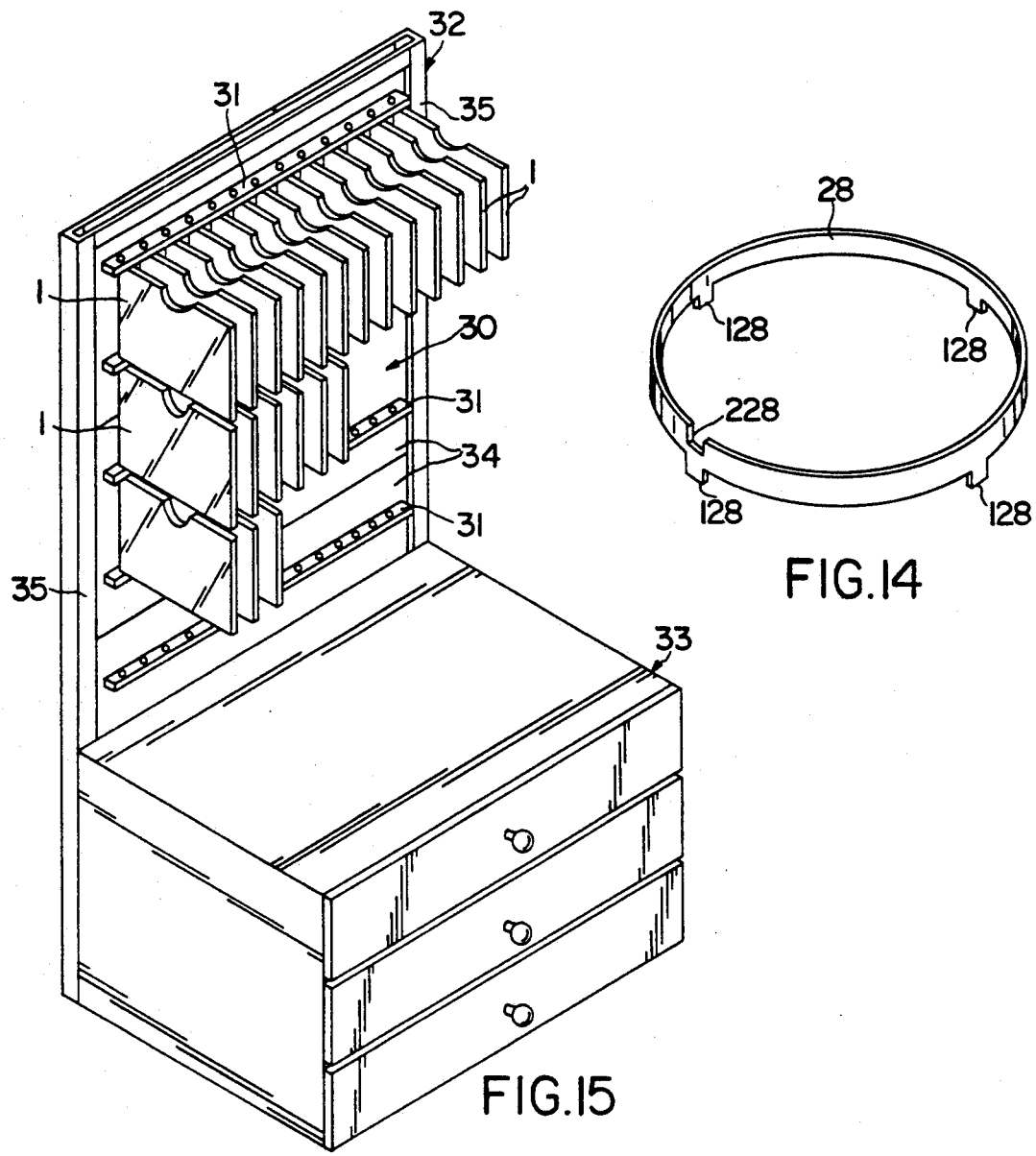
FIG.14
FIG.15
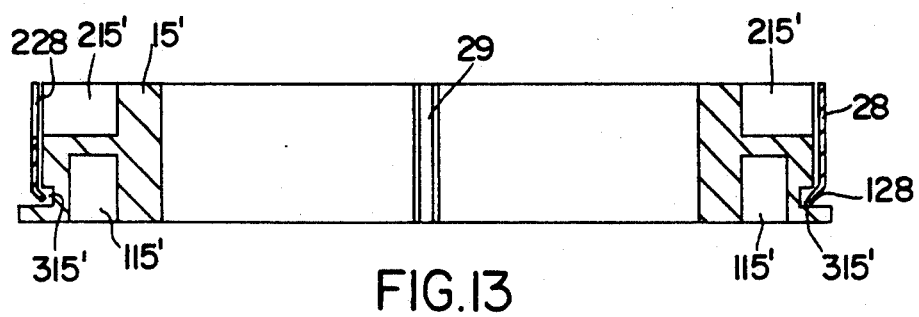
FIG.13

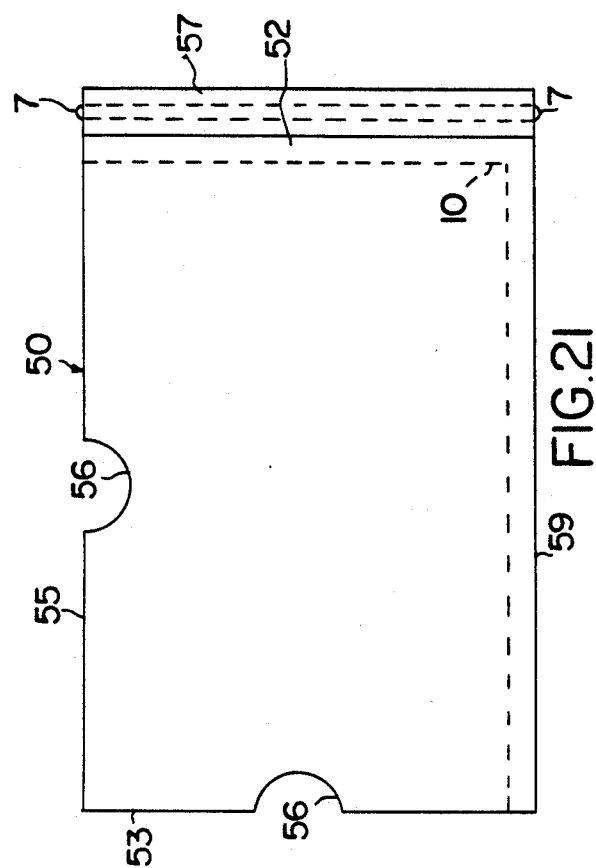
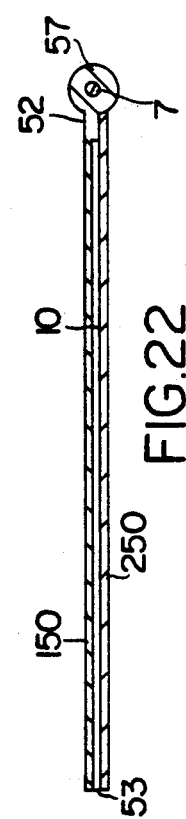
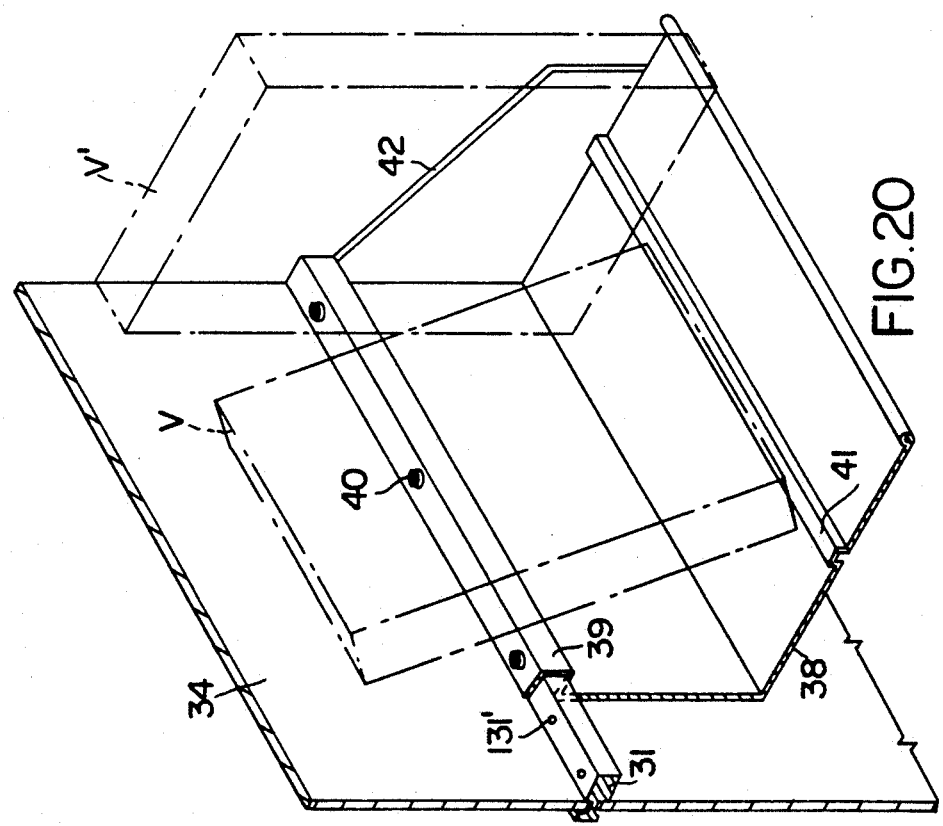

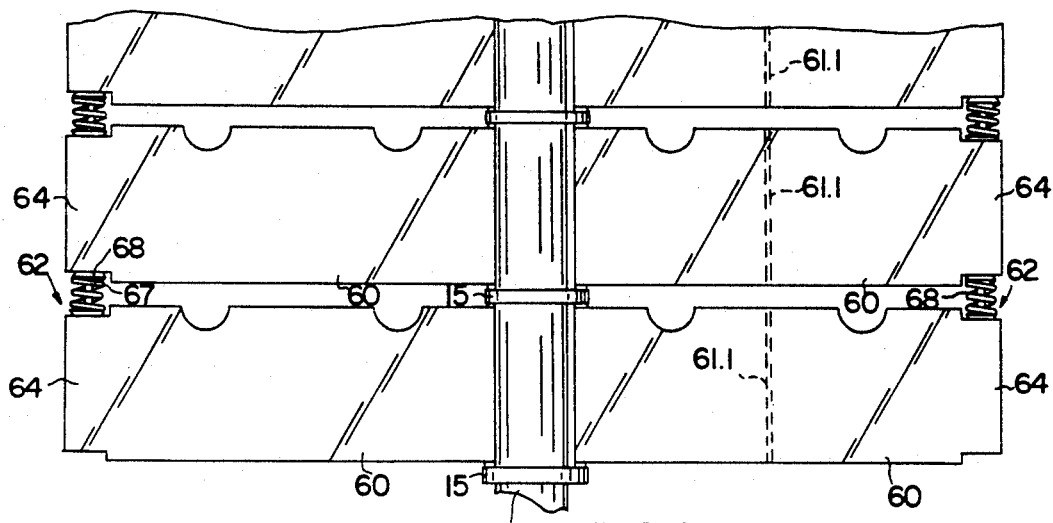
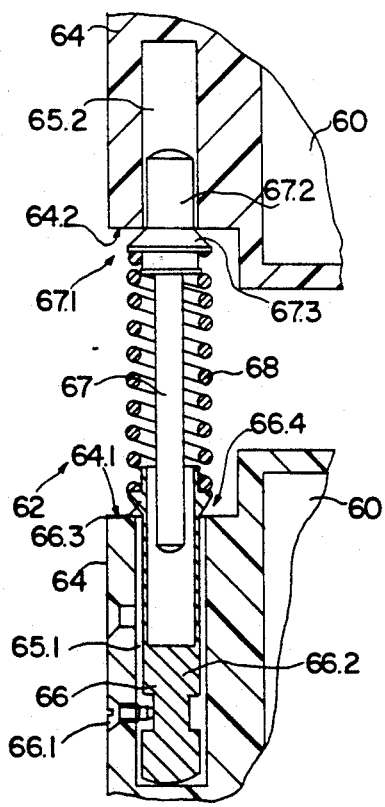
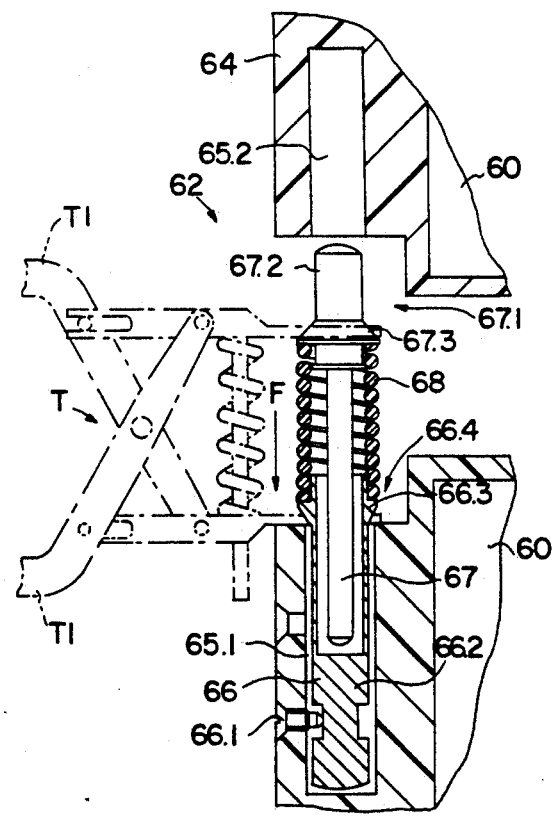
FIG.24
FIG.25
FIG.26

MODULAR APPARATUS USED FOR THE ORDERLY DISPLAY, IN PARTICULAR, OF ADVERTISING FLIERS ACCOMPANYING VIDEOCASSETTES, VIDEOCASSETTES THEMSELVES, OR LIKE MATERIALS

DESCRIPTION

The invention pertains to a modular apparatus used for the orderly display, in particular, of advertising fliers accompanying videocassettes, videocassettes themselves, or like materials. Said apparatus possesses multiple flag-boxes for housing fliers, videocassettes, and the like, with said flag-boxes being made of sturdy, transparent material and mounted in such a way as to swing along one of their edges like a flag around a flagpole.

The aim of the invention is to design a modular apparatus of the above-described type, to be used for the orderly display, in particular, of advertising fliers accompanying videocassettes, videocassettes themselves, or like materials, in such a way that said apparatus proves relatively straightforward and economical to manufacture, lends itself readily to any kind of display setting, and makes it possible for the fliers, videocassettes and the like to be perused and handled in an easy and sensible fashion.

The invention achieves this by means of a modular apparatus used for the orderly display, in particular, of advertising fliers accompanying videocassettes, videocassettes themselves, or like materials, in which the two opposite faces of each flag-box are interconnected in a secure fashion along three edges at most, and separated from one another in such a way as to form a space into or from which a flier or pair of fliers, or a videocassette, or the like, may be inserted or removed.

This way of carrying out the invention means that flag-boxes can be manufactured in an highly straightforward and economical fashion. In fact, not only is the manufacturing process itself rendered speedier and more straightforward, but the flag-boxes themselves may be produced with smaller thicknesses, thereby achieving further savings in terms of materials and bulk.

According to the invention, the flag-boxes may be produced by any method, and made from any transparent sturdy materials, ideally transparent plastic materials. The flag-boxes may comprise two separate pieces, e.g., glued or sealed together, or else they may be produced in a single piece, e.g., by suitably folding a sheet of transparent plexiglass et cetera.

According to a further enhancement of the invention, at least one side of the flag-boxes—the one provided in order to fasten the flag-boxes in such a way that they swing flag-like around the support stand—possesses fastening means, while the support stand is provided with counterpart support components cooperating with the fastening means of the flag-boxes. The flag-boxes' fastening means may be engaged by snapping them shut in their respective housings, or else the joint housings will be provided with suitable movable locking means.

The support stand can be designed in any manner. Ideally, the support stands that are used will be comprised of a support stand, around which the flag-boxes are fastened, or else comprised of a wall support panel which may be fastened to the wall or to a piece of furniture. The flag-boxes may be distributed over the support stand in any particular order. Ideally, the flag-boxes will be arranged side by side and on several superimposed levels.

The invention also encompasses other specifications which further enhance the above-described modular apparatus, and which are dealt with in the subclaims.

The particular features of the invention and their attendant merits will become more apparent after we have described some of the preferred methods of carrying out the invention, a non-exhaustive range of which is illustrated in the attached drawings, in which:

FIGS. 1 and 2 illustrate a prospective view of a flag-box according to a first embodiment of the invention, with one and two pockets respectively.

FIG. 3 illustrates a knocked-down view of a display window according to FIG. 1.

FIG. 5 illustrates, in axial section, an enlarged detail of the support stand of the display apparatus according to FIG. 4, with a flag-box in mounted position.

FIG. 6 and 7 illustrate a detailed view according to FIG. 5, and show the flag-box in two successive intermediate disengagement positions.

Figure 4:
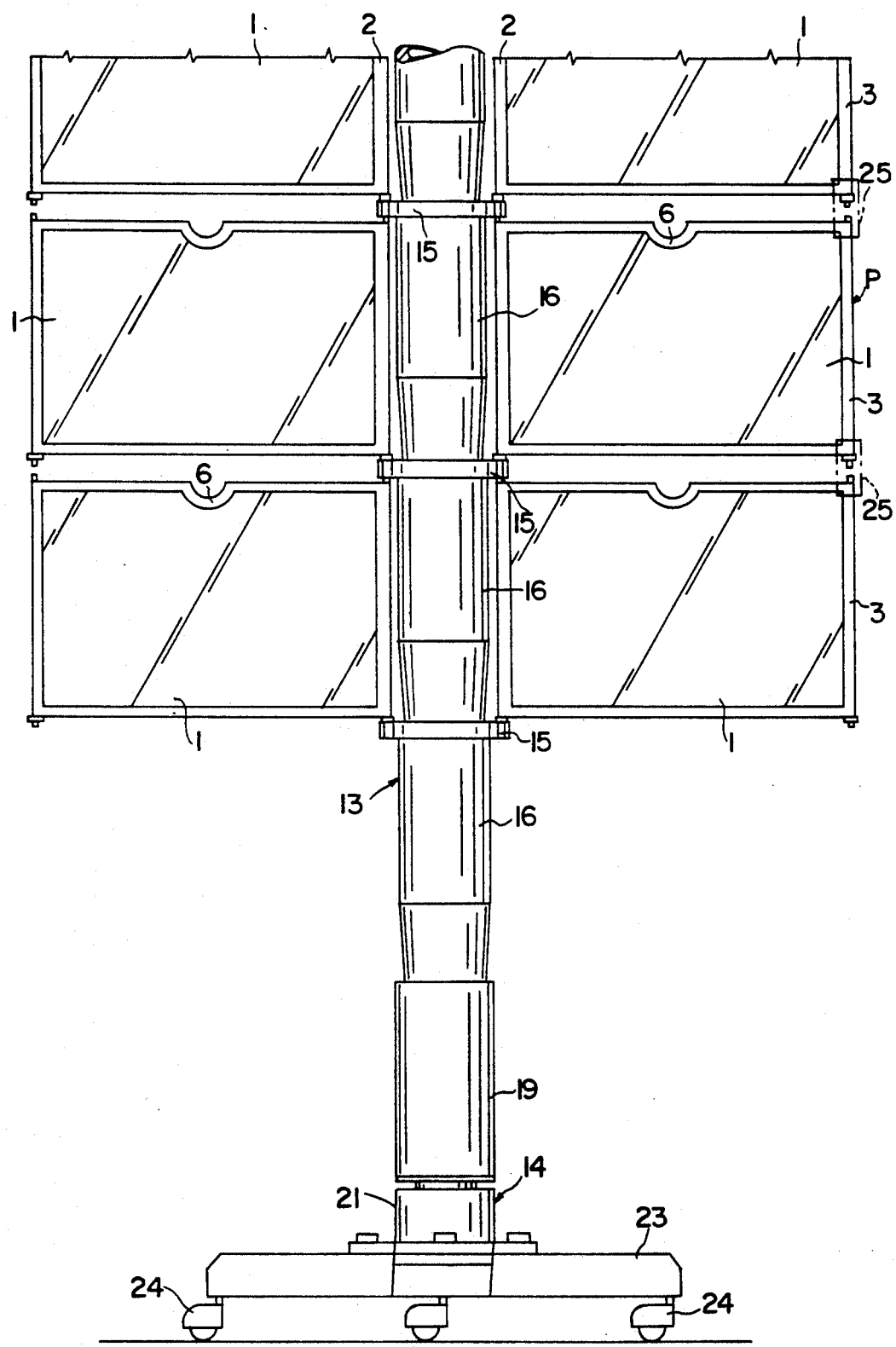
FIG. 4 illustrates a side view of a first embodiment of a column display according to the invention.

FIG. 11 thru 14 illustrate details of an alternative embodiment of a column display apparatus according to FIG. 4.

FIG. 15 illustrates an embodiment of a display apparatus according to the invention using a flat, wall-based stand.

Figure 16:
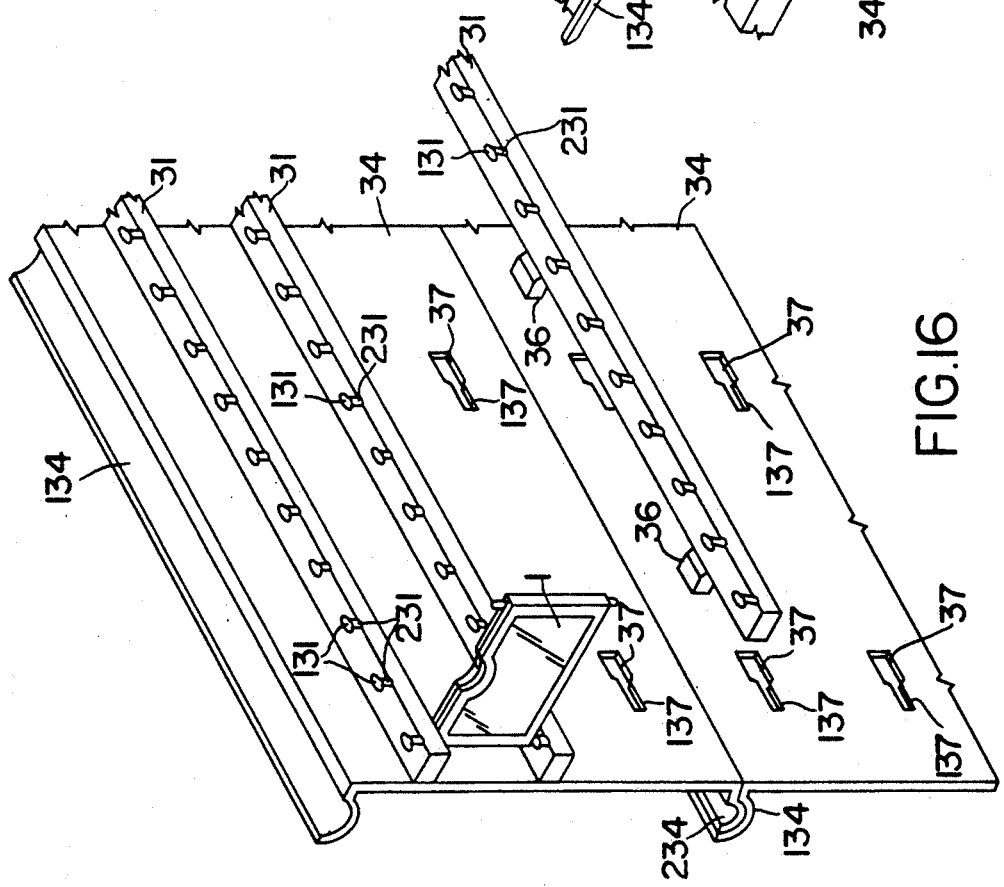

FIG. 16 illustrates a prospective view of a plane modular component of a display apparatus according to FIG. 15.

Figure 18:
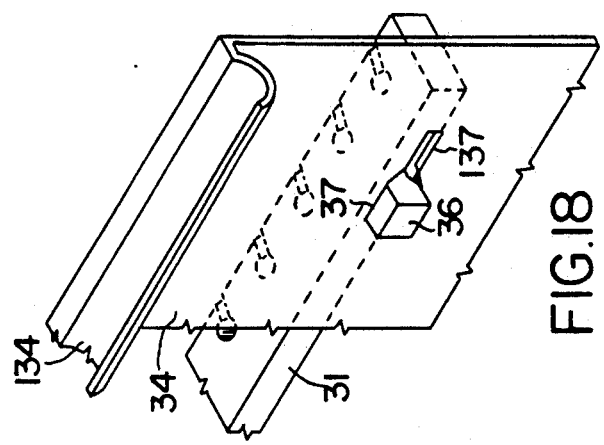
Figure 17:
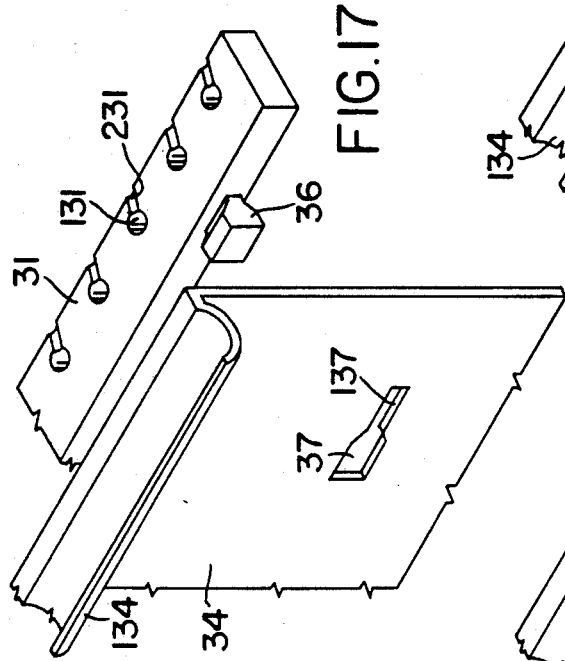
Figure 19:
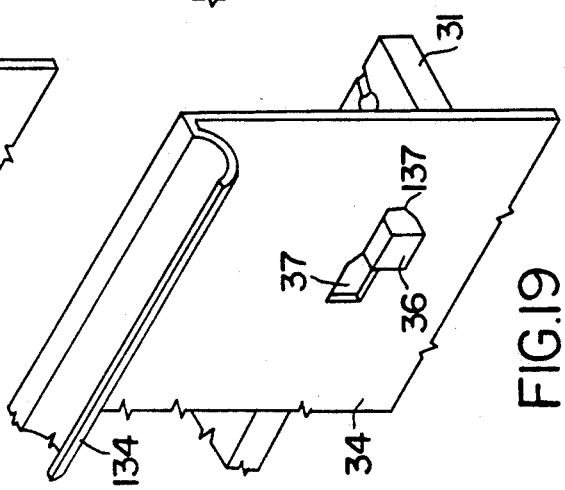

FIGS. 17 thru 19 illustrate each of the two successive stages of mounting a support ledge onto a plane modular component according to FIG. 16.

FIG. 20 illustrates a further enhancement of the display apparatus according to FIG. 15.

FIGS. 21 and 22 illustrate an alternative embodiment of the flag-box to the invention.

Figure 23:
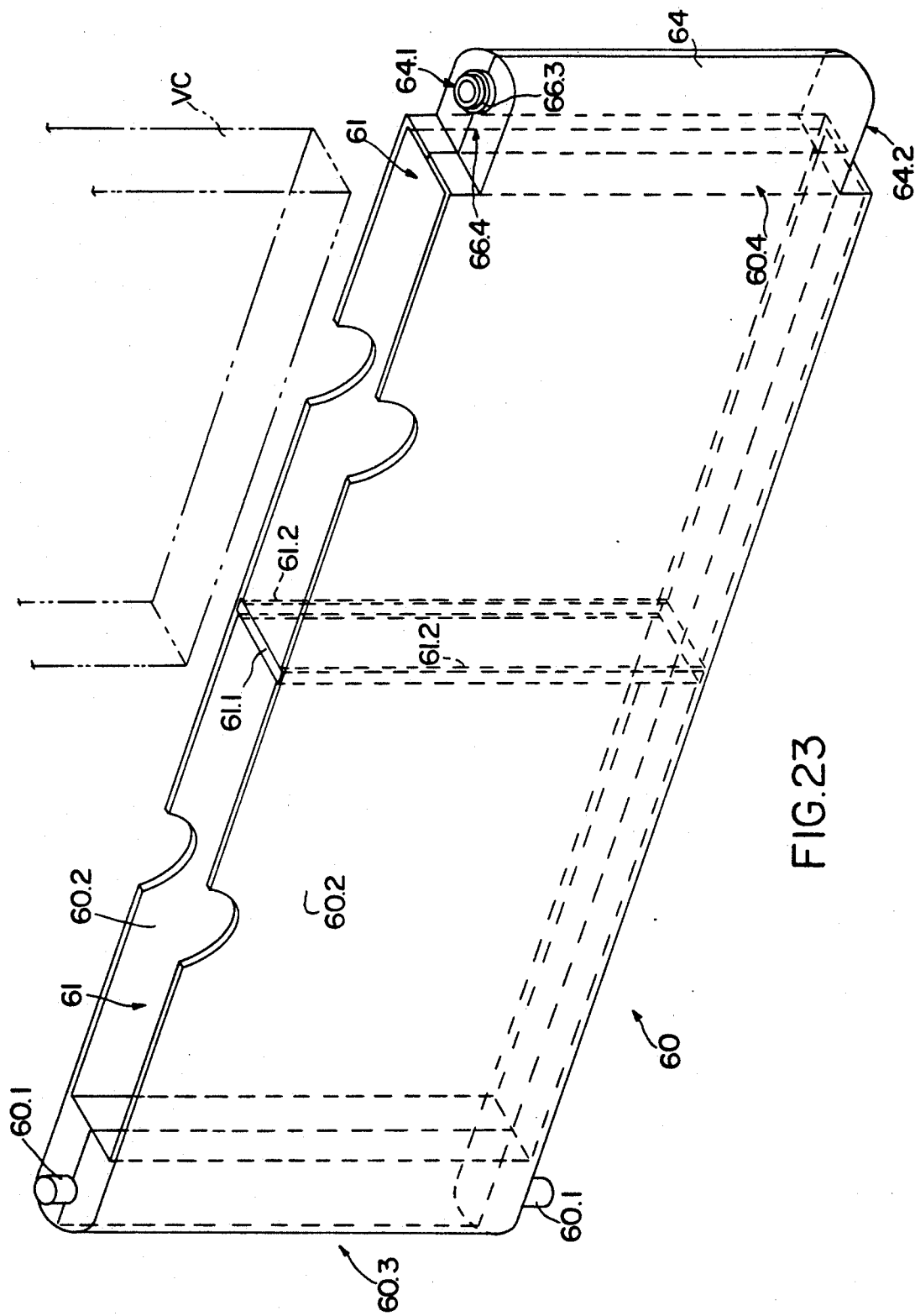

FIG. 23 illustrates a prospective view of a double-pocket flag-box according to another embodiment of the invention.

FIG. 24 illustrates a side view of another embodiment of a column display apparatus according to the invention.

FIGS. 25 and 26 illustrate—in axial cross-section and on a larger scale—an antitheft device, with which the flag-boxes according to FIGS. 23 and 24 are equipped, and illustrate this device in the activated and deactivated position respectively; in these FIGS. 25 and 26, the flag-boxes are represented partially and in breakaway for greater clarity of illustration.

The display apparatus according to the invention makes provision, in a first embodiment, for multiple flag-boxes 1 fastened along one vertical edge 2 to any support stand in such a way that they swing flag-like around a vertical axis substantially coinciding with said fastening edge 2.

FIGS. 1 and 2 illustrate this first embodiment of the flag-boxes according to the invention. The flag-boxes 1 possess an internal pocket-like space for housing a flier 4 for accompanying the videocassettes et cetera, or else two fliers of this type arranged with their rear ends up against one another. The flier or fliers 4, or like materials, are inserted into flag-box 1 through open edge 5, specifically through the upper edge of flag-box 1. In order to make it possible for these fliers 4 to be perused, the flag-boxes, on their front parts at least, are made of transparent material, particularly plastic material. To make it easier to grasp the flier or fliers 4 contained therein, the middle portion of upper edge 5 possesses a grasp recess 6. At its lower end and upper end, each vertical edge 2, 3 of the flag-box possesses a lockpin 7. An annular flange is interposed between the lower lockpin 7 and the associated end of each vertical edge 2 and 3. The flag-boxes may come in any shape or form. According to the alternative embodiment illustrated in FIG. 2, the flag-boxes may also be produced at double length. This double length flag-box possesses two housing spaces interaligned in a direction perpendicular to the axis of oscillation of said flag-box. Each of these two spaces can house a single flier or pair of fliers. The double flag-box in FIG. 2 may be usefully comprised of single flag-boxes 1 interaligned in a direction perpendicular to the axis of oscillation of the flag-box itself. As will be described later on, it can be helpful to connect two single flag-boxes 1 at the two interfacing vertical edges 2 and 3 of the two single flag-boxes 1 by means of a bridge of material marked with letter B.

Both single flag-boxes 1 and double flag-boxes according to FIG. 2 may be manufactured in any manner. Flag-boxes of the type illustrated in FIG. 3 for the single flag-box 1 can be usefully produced with the aid of a pressing process. Here, each flag-box 1 is comprised of two identical semi-boxes 1', 1'' which meet at a middle plane parallel to the flag-box itself. The two semi-boxes 1', 1'' may be joined by sealing, gluing, or jointing. The lockpins 7, the annular flanges 8, as well as vertical edges 2 and 3 and horizontal edges 5 and 9 of the flag-box respectively consist of the semipins 7', 7'', the semi-flanges 8', 8'', the vertical edges 2', 2'' and 3', 3'', and horizontal edges 5', 5'' and 9', 9'' of semi-boxes 1' and 1''. To form the inner housing space of the flag-box 1, the semi-flag-boxes 1' and 1'' possess a recessed step on their interior side, along vertical edges 2', 2'' and 3', 3'' and along the lower horizontal edge 9', 9''. When the two semi-boxes 1' and 1'' are joined, they adhere to one another solely at step 10, and the faces of semi-boxes 1' and 1'' are separated from one another in such a way as to create the housing pocket and open upper edge 5 of flag-box. In the middle portion of upper edge 5, each semi-box 1', 1'' possesses a recess 6' and 6'' to form grip recess 6. Furthermore, the semi-boxes may possess—at step 10 and at semipins 7' and 7''—some small coupling pins 11' and 11'' which, when semi-boxes 1' and 1'' are joined, slot into the counterpart holes 12' and 12'' of the other semi-flag-box. By analogy with the above, even double flag-boxes according to FIG. 2 may be comprised of two identical semi-boxes caused to fit against one another at a longitudinal plane parallel to the faces of the flag-box itself.

This particular flag-box embodiment according to the invention offers major substantial advantages from the manufacturing standpoint. Because the flag-boxes are comprised of two perfectly identical semi-boxes, their manufacturing—particularly if pressing is used—requires just one mold. This makes it considerably easier and more economical to manufacture flag-boxes of this kind. Furthermore, the fact that lockpins 7 are provided at each vertical edge 2, 3 makes it possible to use the flag-box even when the lockpins 7 at one of the vertical edges 2 or 3 are damaged or worn, thereby lengthening the flag-box's service life. The special design of the double-length flag-boxes proves particularly useful, because each double semi-flag-box can be comprised of two single semi-boxes 1' aligned in a direction perpendicular to the axis of oscillation of the flag-box and joined to one another by means of a semi-bridge of material interposed between the two facing vertical edges 2', 3' of the single semi-boxes 1'. This has the great advantage of allowing a single mold to be used for both the manufacturing of the single semi-boxes 1' and the manufacturing of double semi-boxes. In fact, the double semi-boxes may be obtained with one such mold, by providing fill inserts for the mold cavities for the lockpins 7' of vertical edges 2' and 3' associated with the semi-bridge of material. Conversely, to manufacture two single semi-boxes 1', simply use a suitable insert to fill up the mold cavity.

With flag-boxes according to the invention, it is possible to produce any kind of display apparatus, whether it be of the column or wall variety. The flag-boxes according to FIGS. 1 and 2 can be fastened to the support stand in any manner, by using the lockpins 7.

Figure 8:
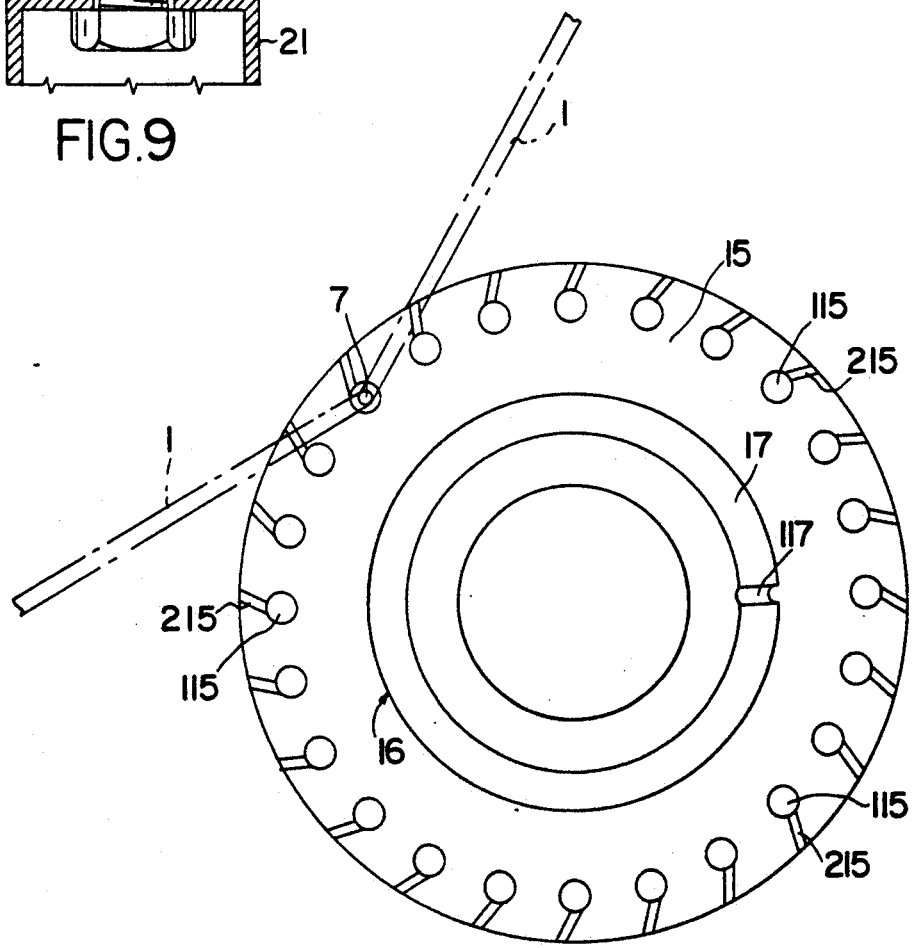
FIG. 8 illustrates a frontal view on the upper head side of a modular/component of the support stand according to FIG. 5.
Figure 12:
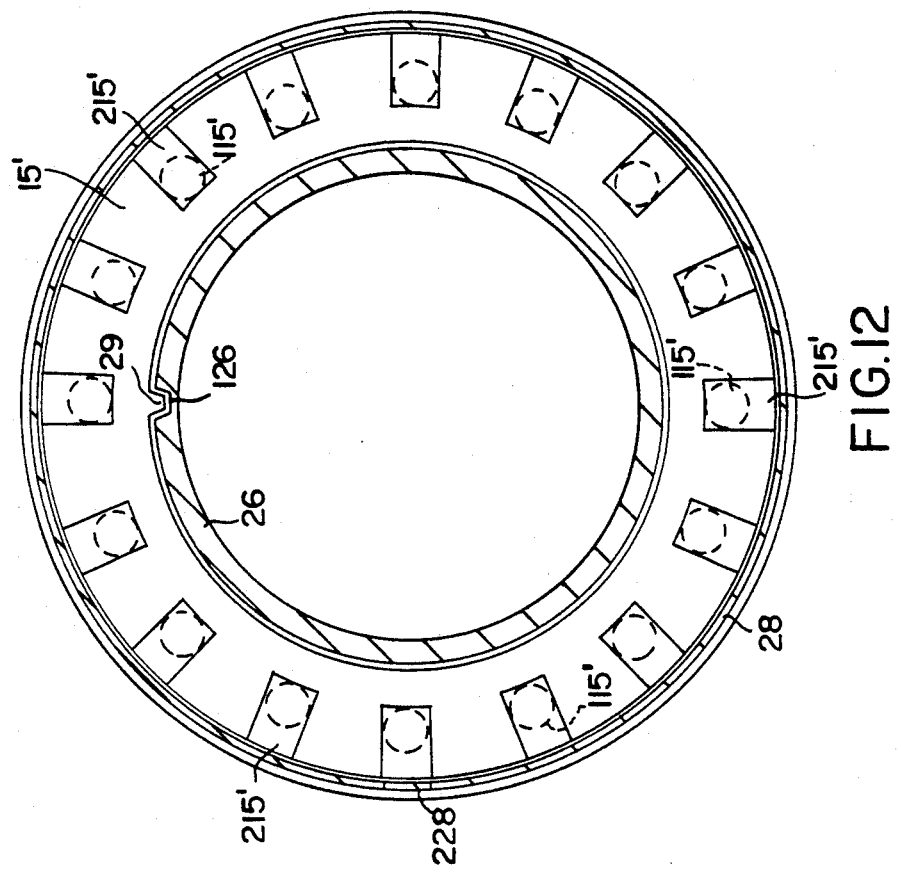

FIG. 4 illustrates a first embodiment of a column display apparatus made with the flag-boxes according to the invention. This apparatus comprises a vertical support stand 13 secured in such a way that it can swivel around its axis on a pedestal 14. The vertical support stand 13 may be made with any kind of cross-section, and in this particular embodiment it is cylindrically shaped. Flag-boxes 1 are fastened to support stand 13 on several layers. To achieve this, the support stand 13 is equipped with multiple support rings 15 projecting radially outward and distributed equidistant from one another along said support stand 13. The distance between two consecutive support rings 15 is chosen to be a little larger than the length of the associated vertical fastening edge 2 of flag-box 1, excluding lockpins 7, but slightly smaller than the length of this fastening edge 2 including lockpins 7. As shown in FIG. 8, each support ring 15 is equipped with a circular row of through holes 115 that are equidistant from one another. On the upper surface of each ring 15, from each hole 115 a groove 215 branches off which extends in an inclined fashion with respect to a radial direction up till the outer edge of ring 15. The support rings 15 of support stand 13 are arranged so that the holes 115 of each ring 15 coincide with the holes 115 of the other support rings 15. Each flag-box 1 is accordingly engaged, in the manner shown in FIG. 5, with its lockpins 7 in the through hole 115 of the support ring 15 associated therewith, and is thus left perfectly oriented in a vertical direction. This flag-box may be swung around a vertical axis substantially coinciding with its fastening edge 2. Its rotation is greatly facilitated by annular flange 8 provided at the lower end of the fastening edge 2, since said flange greatly reduces friction with flag-box 1 by preventing the lower edge 9 thereof from resting directly upon the upper surface of the underlying support ring.

Thanks to the particular choice of distance between the facing surfaces of two support rings 15, relative to the length of the vertical edge 2 of flag-box 1 with or without lockpins 7, and thanks to the grooves 215 provided on the upper surface of support rings 15, this particular way of carrying out the invention makes it easy to mount the flag-boxes on and detach them from support stand 13. FIGS. 6 and 7 illustrate two stages showing how to detach a flag-box from support stand 13. To do this, as shown in FIG. 6, it is sufficient at first to lift flag-box 1, by raising the upper edge 5 thereof to strike against the surface of overhanging support ring 15. In this position of maximum lift, the lower lockpin 7 still penetrates into hole 215 of the lower support ring along a small end section, the length of which is roughly equivalent to the depth of groove 215 associated with hole 115. Subsequently, the lower lockpin 7 may be disengaged from associated hole 115, by being caused to slide along groove 215. This is done by tipping the flag-box 1 upwards (cf. FIG. 7). The bottom end of vertical fastening edge 2 of flag-box 1 is thus freed, and the upper lockpin can be disengaged from associated hole 115, by shifting the flag-box vertically downward.

Figure 9:
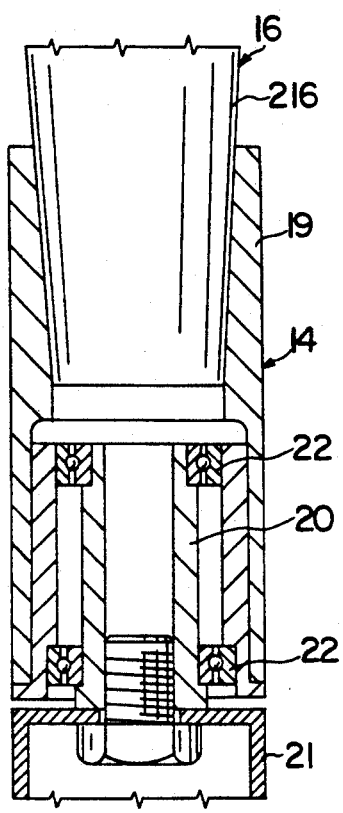
FIG. 9 illustrates, in axial section, a detail of the pedestal of the display apparatus according to FIG. 4.

The support stand 13 and the mounting of support rings 15 thereupon may be executed in any manner whatsoever. In the method of carrying out the invention according to FIGS. 4 thru 7, the support stand 13 is comprised of multiple modular components 16 (cf. FIGS. 4 thru 7) interconnected by coupling. Each modular component 16 has a tubular cylindrical design. The upper end section 116 of the modular component is cylindrically shaped, and at its upper end it carries the support ring 15. Inside, the cylindrical section 116 possesses a conical narrowing 17 which starts from the upper end of the support ring. Lower down, the upper section 116 of modular component 16 is coupled with a lower section 216 which narrows conically downward in a manner equivalent to the internal conical narrowing 17 of the upper section 116. To assemble the support stand, simply fit together the desired number of modular components 16. Furthermore, to facilitate the relative angular positioning of two modular components 16, with the aim of aligning between them the individual holes of their respective support rings 15, as well as of preventing them from rotating vis-á-vis one another, upon the conical narrowing 17 of each modular component we find a rib 117 projecting inwardly and oriented in an axial direction, while the bottom end section 216 of each modular component 16 possesses a counterpart axial groove 18. When the two modular components 16 are joined, axial groove 18 of the upper modular component engages with axial rib 117 of the underlying modular component 16, thereby achieving the desired effect, which is particularly helpful when a support stand 13 is being assembled to rotate around its axis. According to FIG. 9, the pedestal 14 can possess a support pipe 19, the internal upper section of which is conically flared to fit end section 216 of modular components 16. Pipe 19 is supported to swivel by means of ball bearings 22 on an axis 20 solidary with basement 21 of pedestal 14, while, as FIG. 4 shows, the basement 21 itself can possess feet 23 equipped with wheels.

It would be advisable for the feet 23 to be made considerably heavier in their external peripheral end portion, or else to be made heavier at wheels 24, in order to give support stand 13 a very high tilting moment. To achieve this, the feet 23 can be partially filled with ballast material, or else they can be made to support heavy bodies (not shown here) at the same position as the wheels 24.

From the design standpoint, the column display apparatus according to this example proves very useful, inasmuch as the modular components are perfectly identical to one another and are very inexpensive. Furthermore, this column display apparatus is easy to transport around, and swiftly and readily lends itself to a variety of different settings.

Figure 10:
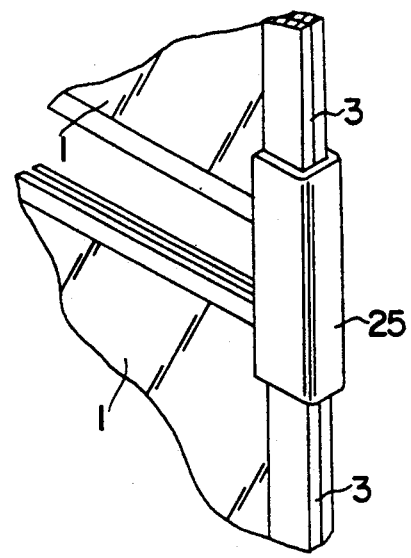
FIG. 10 illustrates, in close-up, a component for connecting two flag-boxes arranged in a vertically superimposed fashion.

According to a further enhancement of the invention, the flag-boxes on the various levels of the display apparatus, the oscillation axes of which are vertically interaligned, can also be interconnected to form a panel, like the one illustrated on the right-hand side of FIG. 4 and marked with a P. For this purpose, use is made of an elastic spring 25 shown in greater detail in FIG. 10. Elastic spring 25 has a substantially U-shaped cross section and length that enables it partially to overlap the free vertical edge 3 at the adjacent corner areas of two vertically aligned flag-boxes 1. At any given time, the display apparatus may possess multiple individual flag-boxes 1, as well as multiple double flag-boxes, in addition to panels P comprised of several superimposed flag-boxes. The panels P themselves may also extend along only a partial section of the length of support stand 13.

FIGS. 11 to 14 illustrate a further embodiment of a column display apparatus according to the invention. In this way of carrying out the invention, the support stand 13 is comprised of a column 26, ideally cylindrical, and ideally assembled to swivel around its axis on a pedestal (not shown). Support rings 15 are simply slipped onto column 26 and separated from one another by means of spacers 276 which simultaneously serve as components for covering the column 26. As FIGS. 11 thru 14 make clear, the lower sides of rings 15' are equipped with a circular row of blind holes 115', while their upper sides are equipped with a matching number of radial grooves 215' having a width substantially equivalent to the diameter of the blind holes 115'. Each radial groove 215' coincides with a blind hole 115' on the opposite side of the ring 15' (cf. FIG. 12) and emerges at the external surface of ring 15', while it terminates with its internal radial end substantially edgewise with the associated blind hole 115'. The outlets of radial grooves 215' are closed off by a lockring 28 assembled in such a way as to rotate freely around the support ring 15'. The four tongues 128 of lockring 28 engage with an annular groove 315' of the support ring 15'; and lockring 28 is provided with a slot 228 at the same height as the outlets of the grooves 215'. In common with the preceding method of carrying out the invention, means have been provided for ensuring the correct relative angular positioning of the support rings 15' in the assembled condition of support stand 13, and for preventing the relative rotation of the rings 15'. Column 26 is equipped with axial groove 126, while the individual rings possess an axial rib 29 projecting radially from their internal surface.

In common with the preceding embodiment of the invention, the upper lockpin 7 of the flag-box engages with a blind hole 115' in the overhanging support ring 15', and its lower lockpin 7 engages with associated radial groove 215' of support ring 15', while the annular flange 8 at lower lockpin 7 prevents the bottom side 9 of the flag-box from getting stuck in groove 215'.

Figure 11:
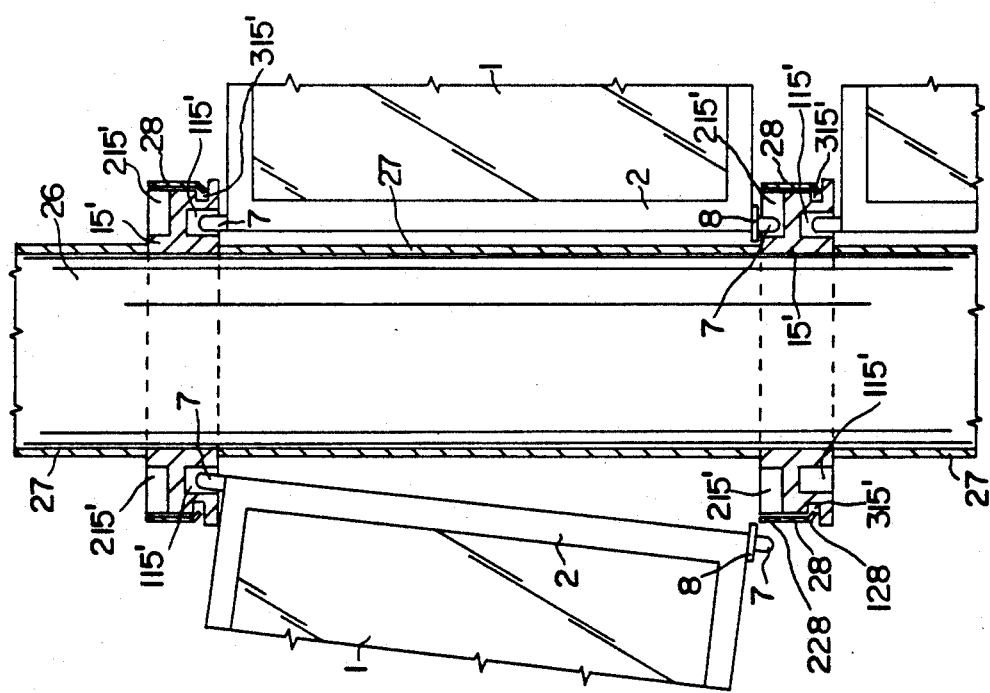

As shown on the left-hand side of FIG. 11, to detach a flag-box from support stand 13, simply rotate lockring 28 until slot 228 coincides with the outlet of the corresponding radial groove 215' and then slip lower lockpin 7 outside groove 215' by tipping the flag-box upward. Upper lockpin 7 may thus be disengaged from the blind hole 115', simply by moving the flag-box downward.

Even though this particular embodiment of the column display apparatus requires a larger number of components, its advantage is that distances between two successive support rings 15' need not be determined with so much precision. Here, in fact, said distance need only be such as to enable the flag-box to swing freely while guaranteeing that lockpins 7 securely engage with the associated blind holes 115' and the associated radial grooves 215'. The column 26 which constitutes the carrying structure of the support stand may also be manufactured in the non-finished state, since it is subsequently covered with metal spacer pipes 27 which can also be used to give the column a more appealing esthetic appearance, and provision can be made for special combinations of metal pipes having different colors.

FIGS. 15 to 18 illustrate one preferred embodiment of a wall support frame. The wall support frame is comprised of a flat panel 30 upon which horizontal support ledges 31 for flag-boxes 1 have been mounted. The support ledges 31 are equidistant from one another and the distance between two support ledges is such as to enable multiple flag-boxes 1 to be fastened there side by side. The display apparatus according to this particular embodiment of the invention accordingly comes with several layers of flag-boxes 1 arranged one on top of the other. The panel 30 may be fastened directly to the wall or else it may be fastened to a frame 32. The frame 32 may in turn be fastened to the wall or else may form part of a piece of furniture, e.g., a chest of drawers 33 which serves as its support stand. Panel 30 will ideally comprise individual plane modular components 34. One embodiment of these plane modular components 34 is shown in greater detail in FIG. 16. Each plane modular element 34 is provided—along its upper edge and along its lower edge—with a posterior tongue respectively marked 134 and 234. The rear tongues 134 and 234 are designed to match one another and are curved with a channel-profile so that posterior tongue 234 on the lower edge of one modular component is inserted into the posterior tongue 134 of an underlying modular component 34. Support frame 32 may here consist of two vertical uprights with a U-shaped cross section, the open sides of which are turned toward one another and form lateral guides into which the individual plane modular components are slotted one on top of the other. Upon each plane modular component are fastened a certain number of support ledges 31, in between which the individual flag-boxes are fastened in turn. The height of the plane modular components 34 is ideally chosen in such a way that the distance between the lower support ledge 31 of one modular component 34 and the higher support ledge 31 of the overlying plane modular component 34 is identical to the distance between the support ledges 31 mounted on one and the same modular component. In this way, it is also possible to fasten the flag-boxes 1 in such a way that they straddle the two plane modular components 34, and thereby make maximum possible use of the available space. In the case at hand, modular design also enables the display apparatus to expand and to adapt perfectly to the available space. Provision can also be made for plane modular components 34 having different colors. For instance, this allows for optical differentiation between the various different areas of the display apparatus dealing with different subject areas or different videocassette genres.

Support ledges 31 for flag-boxes 1 may be designed in any manner whatsoever. In particular, they may be usefully designed in a manner similar to the support rings 15 according to FIGS. 4 thru 8. These support ledges 31 accordingly possess a row of through holes 131, vertical and equidistant from one another and in the upper surface of each support ledge 31, and from each hole 131 a groove branches off which extends in an inclined fashion with respect to the perpendicular of the surface of the plane modular component 34 and emerges at the anterior edge of support ledge 31. As with the embodiment according to FIGS. 4 thru 8, the ledges are interaligned in such a way that the holes in each support ledge 31 ultimately coincide with the holes of the other ledges 31 and the lockpins 7 of a flag-box respectively engage with the hole of the overhanging support ledge 31 and the coincident hole of the underlying support ledge 31. Once again, the distance between the support ledges 31 is such as to enable the flag-boxes 1 to be mounted and unmounted in the manner described earlier for the embodiment according to FIGS. 4 thru 8.

One further helpful feature of the invention enables support ledges 31 to be removably mounted on the modular component 34, specifically by means of a joint attachment. On their posterior side, the support ledges 31 possess two or more dovetail coupling projections 36, while plane modular component 34 is equipped—for each ledge—with an equivalent number of slots 37. Each slot 37 possesses on the same side a narrowing horizontal extension 137. FIGS. 17 thru 19 illustrate certain stages involved in mounting one support ledge 31 and one modular component 34. The coupling projections 36 are inserted into slot 37 and the ledge is then pushed in the direction of the narrowing dimensions 137. During this motion, the inclined surfaces of the dovetail projections 36 cooperate with the edges of the narrowing dimension 137, so that the ledge is drawn against the surface of plane modular component 34 and the coupling projection is accordingly blocked in this position against a dimension in a direction perpendicular to the surface of the plane modular component in question.

In addition to helping to fasten flag-boxes 1, the support ledges 31 can also be used to mount shelves et cetera. FIG. 20 illustrates one useful embodiment of a shelf designed for such a purpose. The shelf designed to be fastened to ledges 31, or to similar ledges provided with threaded holes 131', is comprised of an L-shaped section 38. Along the upper edge of its vertical branch, the section 38 possesses a component 39 for covering the ledge 31, which is a U-shaped section fitting the ledge 31 itself. Thanks to this covering component 39, the shelf may be fastened to the ledge 31, e.g., by means of screws 40. Furthermore, in the middle portion of its horizontal branch, section 38 possesses a rib 41 parallel to the anterior edge of the above mentioned horizontal branch, while the anterior edge has been thickened in a manner corresponding to the thickness of the rib 41. The two side ends of L-shaped section 38 are demarcated by side-pieces 42. Thanks to rib 41, the shelf can be used to display videocassettes, books, or like materials arranged in a slightly inclined fashion, or with their anterior face forward, as indicated with the dot-and-dash object marked V. Moreover, thanks to side-pieces 42 and the thickening of the anterior edge of the shelf, it is also possible to arrange videocassettes, books, or like materials with their posterior edge facing forward, library-book style (cf. dot-and-dash figure marked V'). It follows that a support panel 30 according to the foregoing embodiment of the invention may at any given time support a combination of shelves, single and double flag-boxes, and flag-boxes connected up to form a panel in the manner shown in FIGS. 4 and 10.

FIGS. 21 and 22 illustrate an alternative flag-box embodiment according to the invention. Flag-box 50 possesses two open edges, respectively the vertical edge 53 opposite the vertical fastening edge 52, and the upper edge 55. Both the open upper edge 55 and the open vertical edge 52 [sic] possess a grip recess 56 in their middle portion. Along vertical fastening edge 52 we find a cylindrical fastening appendage 57 possessing a small lockpin at its upper and lower ends. Cylindrical appendage 57 has a tubular design and the upper and lower lockpins 7 consist of the end sections of a metal core inserted into cylindrical appendage 57 and projecting therebeyond at the appendage's two ends. Naturally, these lockpins 7 may be made as simple projections sticking out from the headwalls of the ends of cylindrical appendage 57, or otherwise. The two faces of flag-box 50 are separated from one another by a recessed step 10 provided along vertical edge 52 and along lower horizontal edge 59. Flag-box 50 may also be comprised of two substantially plane parts 150 and 250 joined together at a plane parallel to the flag-box itself, by means of gluing, sealing, et cetera. One of the two parts, 150, carries the cylindrical appendage 57 and the recessed step 10, while the other part 250 is a single sheet of transparent material that can be superimposed edgewise with part 150 at edges 52, 53, 55, 59 of flag-box 50.

FIG. 23 illustrates one further embodiment of a flag-box according to the invention, here marked 60. Flag-box 60 is similar to the double flag-box according to FIG. 2, but differs in that it possesses two pockets 61 each capable of containing a videocassette or compact disk package, e.g., a VC case. The two pockets 61 are formed by means of a removable transverse middle partition wall 61.1, arranged to slide along guide grooves 61.2 provided in the opposite side walls 60.2 of flag-box 60.

In addition, flag-box 60 possesses a single pair of lockpins 60.1, to be found at its vertical lateral edge 60.3 No further description of flag-box 60 will be given at this time.

FIG. 24 illustrates a further embodiment of a column display apparatus according to the invention. Here, support stand 13 uses rings 15 to support multiple flag-boxes 60 arranged at various levels, just as with the embodiment according to FIG. 4. (Only the flag-boxes 60 illustrated on the right-hand portion of FIG. 24 have been provided with partition wall 61.1).

Alternatively, these flag-boxes 60 can be provided with an antitheft apparatus, marked 62 in its entirety, designed to prevent the arbitrary and undesirable removal, by unauthorized persons, of VC items contained in said flag-boxes.

With reference to FIGS. 25 and 26, each flag-box 60 possesses along its free vertical edge 60.4 an integral rib 64 (FIG. 23).

Rib 64 has a lower height than flag-box 60 and forms two stepped horizontal surfaces 64.1, 64.2 (FIG. 25), of which one is lowered with respect to the top face of flag-box 60 while the other is raised with respect to the bottom face of said flag-box.

On these stepped horizontal surfaces 64.1, 64.2 are respectively opened blind holes 65.1 and 65.2 facing one another, having a vertical axis and coaxial vis-á-vis one another, extending partway through rib 64.

Coaxial bush 66 is inserted in upper blind hole 65.1, and fastened there by means of radial clamp screw 66.1. Bush 66 is closed off at its bottom by means of base wall 66.2, and in the proximity of its upper end 66.4, it possesses a conical flange 66.3 emerging from the hole 65.1. This conical flange 66.3 is conically tapering in a direction toward base wall 66.2.

Bush 66 houses a piston rod 67 able to slide freely in an axial direction, with the free end 67.1 of piston rod 67 extending outside bush 66 beyond flange 66.3. This free end 67.1 is shaped like a cylindrical clamp-head 67.2 integral to piston rod 67 and capable of engaging the lower hole 65.2 of another overlying and coplanar flag-box, in a vertical plane, with respect to flag-box 60 carrying bush 66 with piston rod 67. The clamp-head 67.2 of piston rod 67 possesses, in the proximity of the body of piston rod 67, a conical collar 67.3, that is integral and conically tapering in a direction toward the peak of the clamp-head in question.

Interposed between collar 67.3 of clamp-head 67.2 and conical flange 66.3 of bush 66, we find interposed a helical compression spring 68, which normally stresses piston rod 67 axially upward, in the direction of extending away from bush 66, deadbolt fashion. In FIG. 24, for ease of illustration, springs 68 are depicted with a reduced number of coils. The upstroke of piston rod 67 with respect to bush 66, as determined by the elastic strength of spring 68, ensures that its clamp-head 67.2 is automatically inserted into the lower hole 65.2 of overlying flag-box 60 coplanar to flag-box 60 carrying antitheft apparatus 62, while the piston rod itself remains partially engaged and guided inside bush 66. In this position, conical collar 67.3 engages the mouth of lower hole 65.2 (FIG. 25). In this way, the VC item cannot be removed from flag-box 60, since such removal is prevented by the overlying flag-box 60, which is securely attached to flag-box 60 possessing antitheft device 62.

Simply by using a suitable pincer-shaped utensil T (FIG. 26), in such a way as to engage both the conical collar 67.3 of clamp-head 67.2, and the conical flange 66.3 of bush 66, and by closing the gripping arms T1 of said utensil, it is possible to cause piston rod 67 to retract axially into bush 66 (in the direction marked by arrow F in FIG. 26), in competition with the elastic strength of spring 68, until the piston rod's clamp-head 67.2 completely emerges from counterpart hole 65.2 of the overlying flag-box 60. In this position, flag-box 60 equipped with antitheft apparatus 62 may be rotated around its axis of oscillation (identified by pair of hinges 60.1), and the VC item may then be removed from the flag-box in question.

Needless to say, this invention is by no means limited to just those embodiments already described and illustrated; on the contrary, the invention may be varied and amended in a variety of ways, and particularly from the manufacturing standpoint. The fastening components for the flag-boxes need not simply come in the form of support rings or simple rectilinear support ledges, but may instead be made curved or arched by any means whatsoever. In particular, by making use of suitable support stands, support ledges in all shapes and sizes can be interconnected one behind the other in such a way as to produce all manner of support surfaces consisting of individual curved or rectilinear components. The support stand for flag-boxes in the embodiments illustrated here has been executed in a cylindrical shape, but it can also be made with a rectangular cross-section et cetera. To achieve this, use may be made of the above-described plane modular components, e.g., by fastening them to a prismatic frame. In addition, flag-boxes according to the invention may also be mounted with their fastening edge oriented in a horizontal direction. In this case, the support stand may consist of a table or the upper level of a cabinet et cetera. The flag-boxes may themselves be produced in various shapes and in different embodiments, e.g., by means of folding up a sheet of plastic material. The use of flag-boxes according to the invention is not limited to fliers accompanying videocassettes or to videocassettes themselves, but may instead be carried over to any class of products having substantially the same dimensional specifications, e.g., substantially flat objects, such as postcards, record covers, postage stamps, stickers, etc., or else three-dimensional objects, such as compact disk cases, books, newspapers, magazines, and the like.

I claim:

1. A modular apparatus used for the orderly display of videocassettes, advertising fliers which accompany videocassettes and videocassette-shaped items which apparatus comprises a support stand (13, 30), multiple boxes (1, 60) attachably connected thereto and means for connecting the boxes to the stand, said boxes being square or rectangular and having shallow depth in relation to their height and width, such that each box has four narrow edges (2, 3, 9, 60.3, 60.4) and two flat opposing faces, said boxes are made of a sturdy material, said opposing faces being transparent, at least the bottom narrow (9) edge and one vertical narrow edge (2, 3, 60.3, 60.4) but not more than three narrow edges are sealed in such a way that the sealed narrow edges and said opposing faces enclose one or more housing spaces in which said videocassettes, fliers or videocassette-shaped items can be held and can be inserted or removed through the non-sealed narrow edge or edges and in which each box is connected by said connecting means to said support stand to swing on an axis substantially coinciding with one vertical narrow edge (2, 60.3) of each box, characterized in that each box (1, 60) is comprised to two semi-boxes (1', 1'') identical to one another that fit together substantially at a middle plane parallel to the opposing faces of the box itself.

2. The apparatus of claim 1, wherein the two semi-boxes (1', 1'') of each box (1) are joined together by coupling means (11', 11'', 12', 12'').

3. The apparatus of claim 2 wherein the coupling means are lockpins (11', 11'') which slot into counterpart holes (12', 12'').

4. The apparatus of claim 1, wherein the two semi-boxes of each box are joined together by bonding means.

5. The apparatus of claim 1 wherein the means for connecting the boxes to the stand consist of projections (7), parallel to the vertical narrow edge and extending above and below the top and bottom narrow edges, respectively, which are formed by semi-pins (7', 7'') identical to one another and integral to respective semi-boxes (1', 1'') of the box (1).

6. The apparatus of claim 1, in which multiple boxes (1) are arranged on a support stand (13) at various levels and vertically aligned with one another to swing on the same oscillating axis substantially coinciding with a vertical side (2) of the boxes (1), characterized in that an elastic spring connecting component (25), is superimposed over the adjacent ends of the free vertical edges (3) of two vertically aligned boxes (1), in such a way as to form a vertical panel (P) of boxes (1) two by two separably joined together.

7. The apparatus of claim 1, in which multiple boxes (60) are arranged on a support stand (13) at various levels and vertically aligned with one another to swing on the same axis substantially coinciding with a vertical side (60.3) of the boxes (60), which have two opposite vertical sides (60.3, 60.4), characterized in that each box (60) possesses a piston rod (67), freely slidable in the axial direction in a vertical hole (65.1), formed at its free vertical side (60.4), and whose free end portion (67.1) extends beyond the hole (65.1) and engages an opposite hole (65.2) of an adjacent end of the free vertical side (60.4) of another box (60), elastic means (68) ensuring that the piston rod's end portion (67.1) engages the opposite hole (65.2), in such a way as to form a vertical panel of boxes (60) two by two separably joined together, the piston rod's end portion (67.1) being caused to withdraw axially from the opposite hole (65.2) of the other box (60) by means of a utensil (T) when the box (60) carrying the piston rod itself is to be rotated around the oscillating axis independently from the above other box (60).

8. The apparatus of claim 1, wherein each box (1, 60) posesses two or more housing spaces, (61) aligned to one another in the said middle plane, in a direction perpendicular to the said axis and formed by means of one or more transverse partition walls (61.1).

9. The apparatus of claim 1, in which the support stand (13) comprises a substantially vertical support column, wherein the support column is comprised of a plurality of tubular modular components (16), the axial ends (216, 17) of which are inserted into one another and provided with means (117, 18) for preventing them from rotating vis-à-vis one another, support ring (15) being provided to one end of each modular component (16), radially projecting outwardly therefrom, and two adjacent support rings (15) possessing means for fastening, in swingable fashion, multiple boxes (1, 60) standing side by side one another.

10. The apparatus of claim 9, wherein the support column is swivelable, the said fastening means comprise holes (115) which correspond to said means for connecting the boxes to the stand and said fastening means allow the boxes to be removable.

11. The apparatus of claim 1, in which the support stand (13) comprises a substantially vertical support column, wherein support rings (15') are mounted on the support column (26), radially projecting outwardly therefrom, with a modular spacer pipe (27) co-axially interposed between each pair of adjacent support rings (15'), means (29, 126) for preventing rings (15') from rotating on the support column (26) being provided and two adjacent support rings (15') possessing means for fastening, in swingable fashion, multiple boxes (1, 60) standing side by side one another.

12. The apparatus of claim 11, wherein the support column is swivelable, the said fastening means comprise holes (115') and grooves (215') which correspond to the said means for connecting the boxes to the stand and said fastening means allow the boxes to be removable.

13. The apparatus of claim 1, in which the support stand comprises a flat and substantially vertical panel (30) on which support ledges (31) are provided for fastening, in swingable fashion, multiple boxes (1) standing side by side one another, wherein the flat panel (30) consists of a plurality of plane modular components (34) possessing removable connecting means (134, 234) along their upper and lower edges, which consist of posterior tongues curved in matching fashion with a channel shaped profile.

14. The apparatus of claim 13, wherein the fastening means allow the boxes to be removable.

* * * * *